US007376235B2

(12) United States Patent
Kuehnel

(10) Patent No.: US 7,376,235 B2
(45) Date of Patent: May 20, 2008

(54) METHODS AND SYSTEMS FOR FRUSTRATING STATISTICAL ATTACKS BY INJECTING PSEUDO DATA INTO A DATA SYSTEM

(75) Inventor: Thomas Kuehnel, Freemont, CA (US)

(73) Assignee: Microsoft Corporation, Redmond, WA (US)

( * ) Notice: Subject to any disclaimer, the term of this patent is extended or adjusted under 35 U.S.C. 154(b) by 612 days.

(21) Appl. No.: 10/207,619

(22) Filed: Jul. 29, 2002

(65) Prior Publication Data

US 2003/0204717 A1 Oct. 30, 2003

Related U.S. Application Data

(63) Continuation of application No. 10/135,171, filed on Apr. 30, 2002, now abandoned.

(51) Int. Cl.
*H04L 9/00* (2006.01)
(52) U.S. Cl. .................. 380/267; 380/46; 380/277; 713/150; 726/30
(58) Field of Classification Search .......... 380/46, 380/277, 267; 713/150; 726/30
See application file for complete search history.

(56) References Cited

U.S. PATENT DOCUMENTS

| | | | | |
|---|---|---|---|---|
| 3,377,625 A | * | 4/1968 | Filipowsky | 375/271 |
| 3,798,360 A | * | 3/1974 | Feistel | 380/37 |
| 3,962,539 A | * | 6/1976 | Ehrsam et al. | 380/29 |
| 4,078,152 A | * | 3/1978 | Tuckerman, III | 380/37 |
| 4,157,454 A | * | 6/1979 | Becker | 380/37 |
| 4,264,782 A | | 4/1981 | Konheim | |
| 4,275,265 A | * | 6/1981 | Davida et al. | 380/29 |
| 4,306,111 A | * | 12/1981 | Lu et al. | 380/30 |
| 4,316,055 A | * | 2/1982 | Feistel | 380/37 |
| RE32,776 E | * | 11/1988 | Saylor | 348/463 |
| 4,803,481 A | * | 2/1989 | Mueller et al. | 340/825.5 |
| 4,835,628 A | * | 5/1989 | Hinz et al. | 360/48 |
| 4,918,728 A | | 4/1990 | Matyas et al. | |
| 4,932,053 A | * | 6/1990 | Fruhauf et al. | 380/252 |

(Continued)

OTHER PUBLICATIONS

Menezes et al., Handbook of Applied Cryptography, 1996, CRC Press, chapter 9, pp. 321-383.*

(Continued)

*Primary Examiner*—Nasser Moazzami
*Assistant Examiner*—David Garcia Cervetti
(74) *Attorney, Agent, or Firm*—Wolf, Greenfield & Sacks, P.C.

(57) ABSTRACT

Disclosed are methods and systems for frustrating statistical attacks. A sender and receiver agree upon an encryption and integrity encoding scheme. For each "real" data packet, the sender generates integrity information, puts it in the packet, and then encrypts the packet using the agreed-upon scheme. Every now and again, the sender generates a "pseudo-data" packet encoded using a scheme different from the agreed-upon scheme. When the real-data and pseudo-data packets arrive at the receiver, they are decrypted using the agreed-upon scheme, and their validity is verified using the integrity information. Verification succeeds for real-data packets, and their data are accepted as valid. Verification fails for pseudo-data packets, however, and their data are discarded. An eavesdropper cannot differentiate pseudo-data from real-data and so cannot help but use all of the packets in its analysis. This mingling of pseudo-data with real-data frustrates the eavesdropper's statistical attempt to uncover the agreed-upon encoding scheme.

22 Claims, 10 Drawing Sheets

U.S. PATENT DOCUMENTS

| | | | | |
|---|---|---|---|---|
| 4,979,832 | A * | 12/1990 | Ritter | 380/28 |
| 5,003,597 | A * | 3/1991 | Merkle | 380/37 |
| 5,164,943 | A * | 11/1992 | DeSouza et al. | 714/703 |
| 5,214,703 | A * | 5/1993 | Massey et al. | 380/37 |
| 5,231,662 | A * | 7/1993 | van Rumpt et al. | 713/193 |
| 5,341,423 | A * | 8/1994 | Nossen | 380/252 |
| 5,515,438 | A | 5/1996 | Bennett et al. | |
| 5,604,806 | A * | 2/1997 | Hassan et al. | 380/44 |
| 5,642,350 | A * | 6/1997 | Dailey | 370/439 |
| 5,689,565 | A | 11/1997 | Spies et al. | |
| 5,706,348 | A | 1/1998 | Gray et al. | |
| 5,708,961 | A * | 1/1998 | Hylton et al. | 725/81 |
| 5,719,941 | A | 2/1998 | Swift et al. | |
| 5,724,428 | A * | 3/1998 | Rivest | 380/37 |
| 5,727,062 | A * | 3/1998 | Ritter | 380/37 |
| 5,745,577 | A * | 4/1998 | Leech | 380/28 |
| 5,805,567 | A * | 9/1998 | Ramesh | 370/204 |
| 5,805,705 | A | 9/1998 | Gray et al. | |
| 5,838,794 | A * | 11/1998 | Mittenthal | 380/28 |
| 5,933,501 | A * | 8/1999 | Leppek | 380/259 |
| 5,995,629 | A * | 11/1999 | Reiner | 380/265 |
| 6,021,069 | A * | 2/2000 | Hung et al. | 365/185.22 |
| 6,021,203 | A | 2/2000 | Douceur et al. | |
| 6,049,614 | A * | 4/2000 | Kim | 380/263 |
| 6,052,466 | A * | 4/2000 | Wright | 380/262 |
| 6,161,180 | A | 12/2000 | Matyas et al. | |
| 6,185,304 | B1 * | 2/2001 | Coppersmith et al. | 380/37 |
| 6,185,596 | B1 * | 2/2001 | Hadad et al. | 708/491 |
| 6,233,338 | B1 * | 5/2001 | Leppek | 380/28 |
| 6,243,579 | B1 * | 6/2001 | Kari | 455/426.1 |
| 6,243,812 | B1 | 6/2001 | Matyas et al. | |
| 6,304,657 | B1 * | 10/2001 | Yokota et al. | 380/28 |
| 6,324,187 | B1 * | 11/2001 | Watanabe et al. | 370/522 |
| 6,373,851 | B1 * | 4/2002 | Dadario | 370/445 |
| 6,393,125 | B1 * | 5/2002 | Barbir | 380/22 |
| 6,404,888 | B1 * | 6/2002 | Barbir | 380/22 |
| 6,408,075 | B1 * | 6/2002 | Ohki et al. | 380/28 |
| 6,442,190 | B1 * | 8/2002 | Nguyen | 375/141 |
| 6,466,589 | B1 * | 10/2002 | Chou | 370/518 |
| 6,480,471 | B1 * | 11/2002 | VanZante et al. | 370/252 |
| 6,542,607 | B1 * | 4/2003 | Euchner et al. | 380/37 |
| 6,615,354 | B1 * | 9/2003 | Ohki et al. | 713/193 |
| 6,628,786 | B1 * | 9/2003 | Dole | 380/44 |
| 6,631,471 | B1 * | 10/2003 | Ohki et al. | 713/193 |
| 6,732,157 | B1 * | 5/2004 | Gordon et al. | 709/206 |
| 6,766,489 | B1 * | 7/2004 | Piret et al. | 714/755 |
| 6,782,473 | B1 * | 8/2004 | Park | 713/160 |
| 6,845,159 | B1 * | 1/2005 | Domstedt et al. | 380/44 |
| 6,934,388 | B1 * | 8/2005 | Clark | 380/47 |
| 6,940,852 | B1 * | 9/2005 | Washburn | 370/389 |
| 6,996,122 | B1 * | 2/2006 | Miyagoshi et al. | 370/465 |
| 2001/0036174 | A1 * | 11/2001 | Herring | 370/352 |
| 2002/0046291 | A1 * | 4/2002 | O'Callaghan et al. | 709/238 |
| 2002/0064279 | A1 * | 5/2002 | Uner | 380/44 |
| 2002/0124178 | A1 * | 9/2002 | Kocher et al. | 713/193 |
| 2003/0041165 | A1 * | 2/2003 | Spencer et al. | 709/233 |
| 2003/0068039 | A1 * | 4/2003 | Lee et al. | 380/44 |

OTHER PUBLICATIONS

AirSnort Homepage (2 pgs.), retrieved at http://airsnort.sourceforge.net/ on Jan. 2, 2002.

"Security of the WEP algorithm" (4 pgs.), retrieved at http://www.isaac.cs.berkeley.edu/isaac/wep-faq.html on Jan. 7, 2002.

"WEP cracked—so what?" (2 pgs.), retrieved at http://lists.samba.org/pipermail/wireless/2001-February/002041.html on Jan. 7, 2002.

"Slashdot Chair of IEEE 802.11 Responds to WEP" (7 pgs.), retrieved at http://slashdot.org/articles/01/02/15/1745204.shtml on Jan. 7, 2002.

Mannion, "Cipher attack delivers heavy blow to WLAN security," EETIMES.com, (6 pgs.), retrieved at http://www.eetimes.com/story/OEG20010803S0082 on Jan. 7, 2002.

* cited by examiner

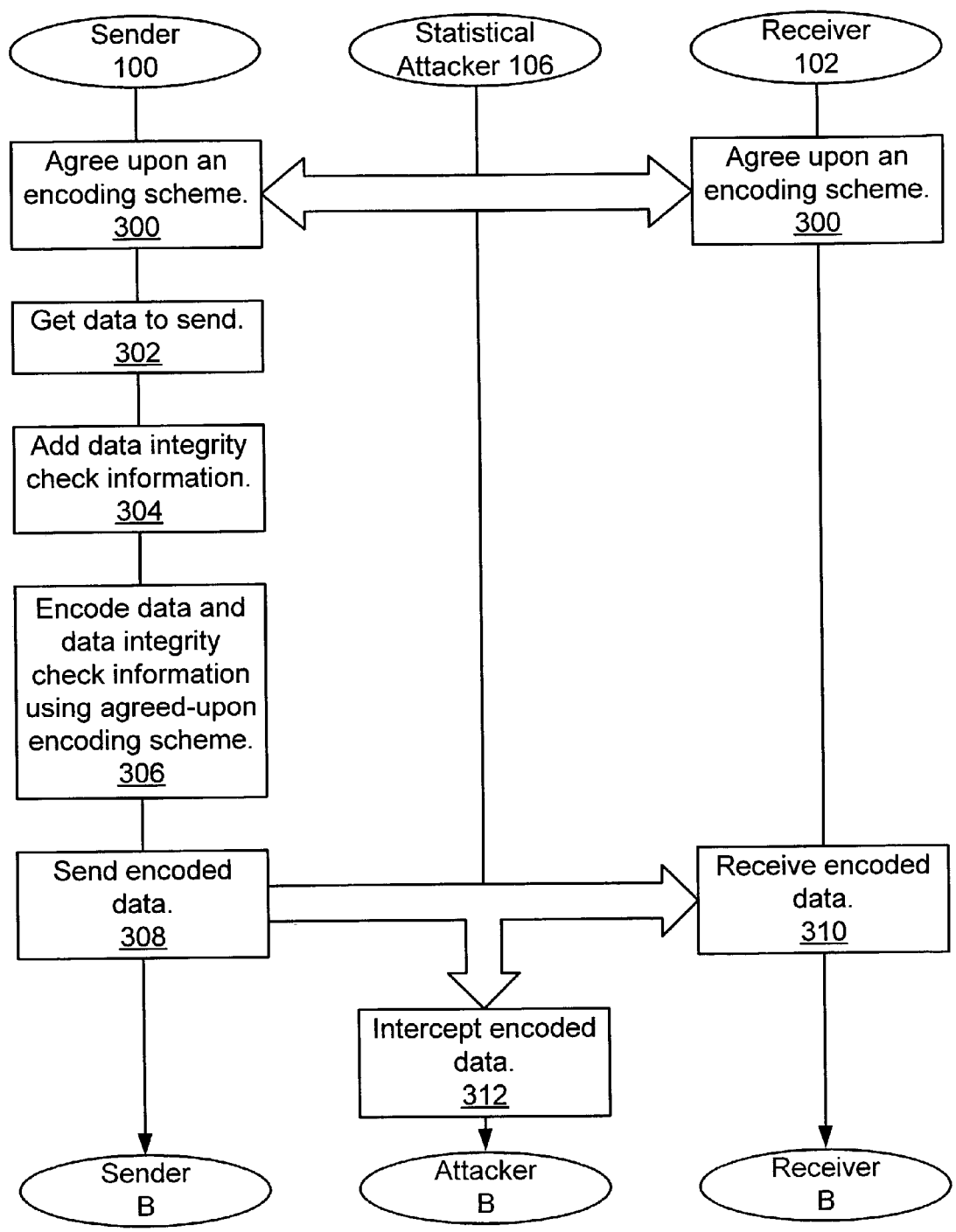

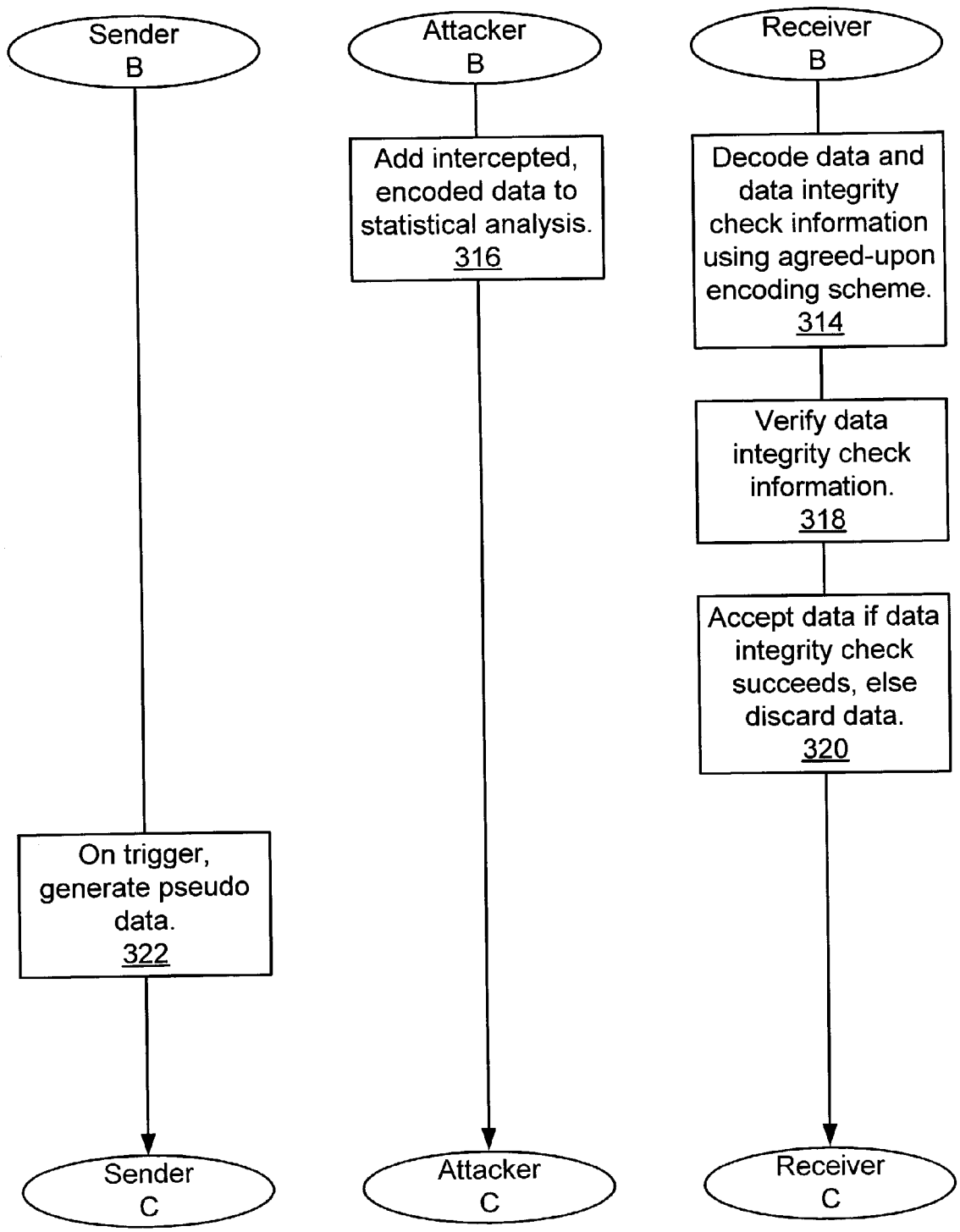

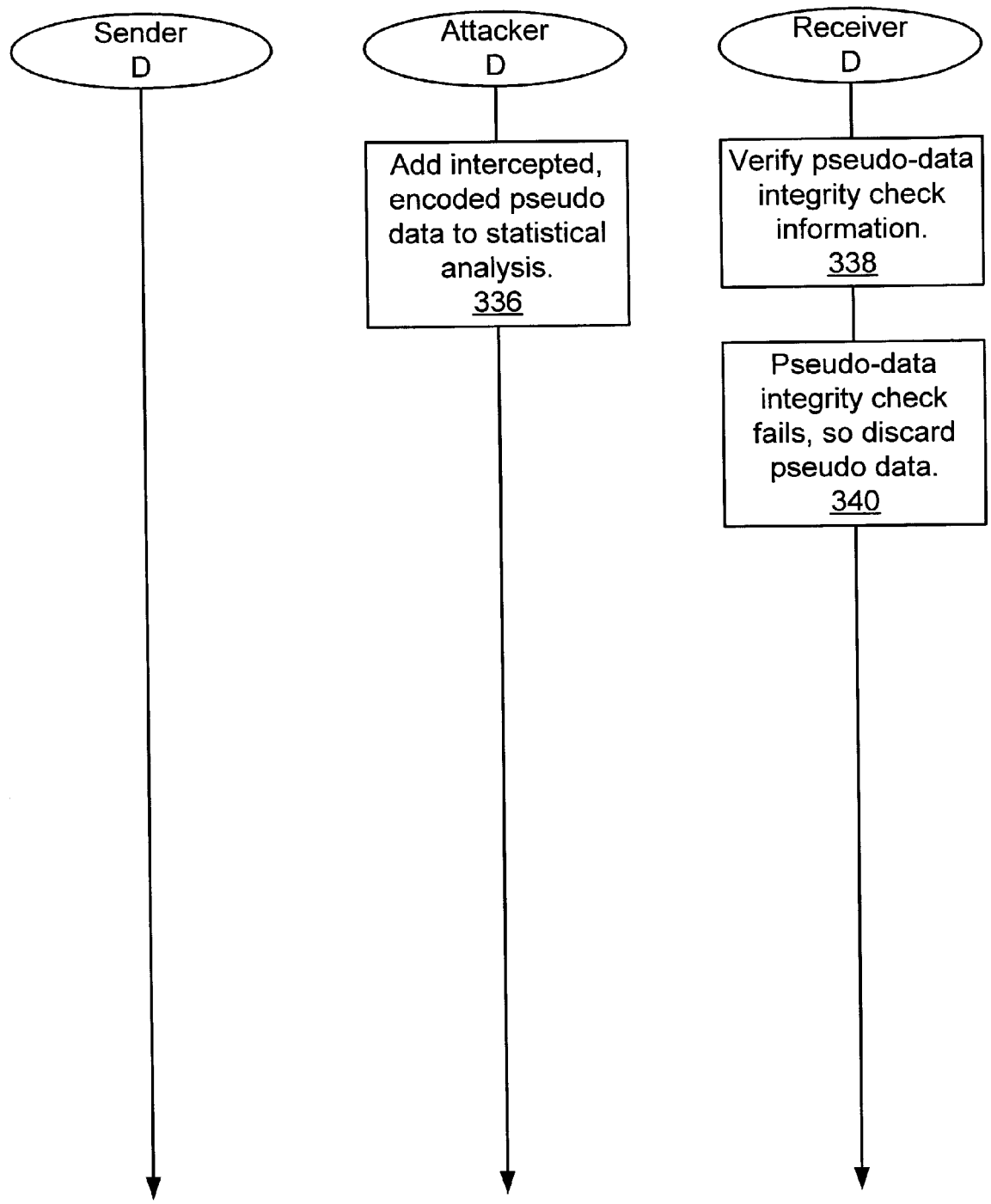

METHODS AND SYSTEMS FOR FRUSTRATING STATISTICAL ATTACKS BY INJECTING PSEUDO DATA INTO A DATA SYSTEM

CROSS-REFERENCE TO RELATED APPLICATION

The present application is a continuation of U.S. patent application Ser. No. 10/135,171, "Methods and Systems for Frustrating Statistical Attacks by Injecting Pseudo Data into a Data Stream," filed Apr. 30, 2002 now abandoned, which is incorporated herein by reference in its entirety.

TECHNICAL FIELD

The present invention is related generally to network security, and, more particularly, to enhancing security in network communications by frustrating statistical attacks.

BACKGROUND OF THE INVENTION

As computer networks grow larger and carry much more sensitive data, securing that data is becoming increasingly more important. However, a vast majority of networks are vulnerable to security attacks. In one form of attack, an eavesdropper listens to network communications to obtain security information from legitimate network users. With that information in hand, the eavesdropper can access sensitive data sent by the legitimate users. These security attacks are especially worrisome to devices that communicate via wireless technologies, e.g., that use the 802.11 protocol, because it is difficult or impossible to restrict physical access to their communications.

To protect the privacy of data against network attacks, data transmitted over a network are often encrypted. In a typical data encryption method, the sender and the receiver first agree upon a data-encoding scheme. The sender encrypts the data using the agreed-upon encoding scheme and sends the encrypted data to the receiver. Upon reception, the receiver decrypts the data using the agreed-upon encoding scheme. Although the encrypted data may still be eavesdropped, the eavesdropper cannot obtain the original data without knowing the agreed-upon encoding scheme. Thus, data encryption provides security protection for communications between the sender and the receiver.

To ensure that the data have not been corrupted in transit, the sender and receiver also agree upon a data integrity check scheme. The sender attaches data integrity check information (e.g., a checksum) to the data before encryption and transmission. The receiver applies the agreed-upon data integrity check scheme to the received and decrypted data. By comparing the receiver-calculated integrity check with the check sent with the data, the receiver verifies the integrity of the data. If the receiver-calculated integrity check matches the sent integrity check, the receiver accepts the data as valid. Otherwise, the receiver treats the data as invalid and discards them.

However, encryption and data integrity checking are not sufficient protection. Encrypted data are still subject to a number of attacks, for example, to a statistical attack. In a statistical attack, an eavesdropper analyzes a set of encrypted data packets in order to tease out patterns that are associated with the encoding scheme agreed upon by the sender and the receiver. From the patterns, the eavesdropper may discover the encoding scheme and use it to decrypt the encrypted data.

Because of the statistical nature of this method of attack, its accuracy improves with an increasing number of data packets analyzed. Thus one approach to frustrate statistical attacks is to limit the amount of data sent using any one encoding scheme. To do this, the agreed-upon encoding scheme may be changed frequently. However, changing the encoding scheme involves significant communications overhead for the sender and the receiver. What is needed is a way to frustrate statistical attacks without invoking the overhead of changing the agreed-upon encoding scheme.

SUMMARY OF THE INVENTION

In view of the foregoing, the present invention provides methods and systems for frustrating statistical attacks by injecting pseudo-data packets into a data packet stream. When a sender intends to send data packets to a receiver over a network connection, the sender and the receiver first agree upon an encryption and data integrity check encoding scheme. For each "real" data packet it sends, the sender generates data integrity check information and puts it in the data packet. The sender then encrypts the "real" data packet using the agreed-upon encryption scheme. The encoded data packet is transmitted to the receiver over the network connection. Every now and again, the sender generates a "pseudo-data" packet by encoding a data packet, along with its data integrity check information, using an encoding scheme different from the agreed-upon encoding scheme. The encoded pseudo-data packet is then transmitted to the receiver over the network connection. Upon reception, the receiver decrypts each data packet, whether real or pseudo, using the agreed-upon encoding scheme. The receiver verifies the validity of the decrypted data by using the decrypted data integrity check information in the data packet. For each real-data packet, the verification succeeds (unless the data packet was corrupted in transit), and the receiver accepts the data as valid. However, pseudo-data packets fail in verification because they were encrypted with a different encoding scheme. Therefore, the receiver discards the decrypted pseudo-data packets.

Meanwhile, an eavesdropper may intercept the encrypted data packets and subject them to statistical analysis. The eavesdropper, however, cannot differentiate the pseudo-data packets from the real-data packets because the eavesdropper knows neither the agreed-upon encoding scheme nor the different encoding scheme used for the pseudo-data packets. The eavesdropper cannot help but use all of the data packets, real and pseudo, in its statistical analysis. This mingling of pseudo-data packets, which do not conform to the agreed-upon encoding scheme, with the real-data packets frustrates the statistical analysis used to attempt to uncover that encoding scheme.

Even though the eavesdropper cannot decrypt the data packets, it may still be able to determine which packets contain pseudo-data and so prevent them from frustrating the statistical attack. The eavesdropper can do this by monitoring differences in the overall shape (e.g., data packet sizes and transmission rates) of the traffic sent by the sender. To prevent this, aspects of the present invention generate and send pseudo-data packets at random intervals so that the shape of the combined real- and pseudo-data traffic closely matches that expected for real-data traffic alone.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 3a through 3d together form a dataflow diagram showing the messages passed and the operations performed by a sender and a receiver for frustrating statistical attacks according to one aspect of the present invention;

DETAILED DESCRIPTION OF THE INVENTION

Figure 1:
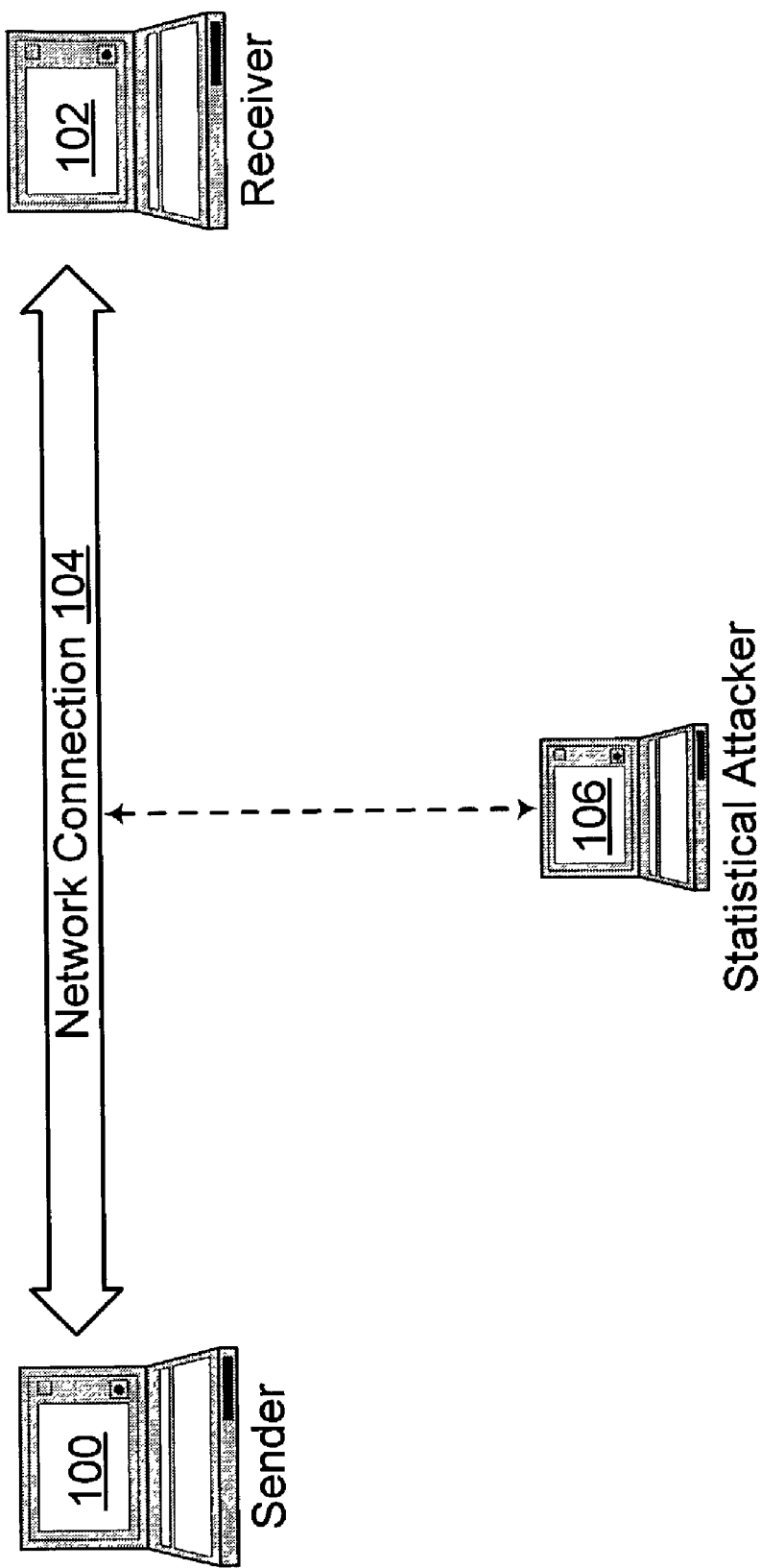
FIG. 1 is a block diagram showing an exemplary network communications setup and a statistical attacker.

Turning to the drawings, wherein like reference numerals refer to like elements, the present invention is illustrated as being implemented in a suitable computing environment. The following description is based on embodiments of the invention and should not be taken as limiting the invention with regard to alternative embodiments that are not explicitly described herein.

In the description that follows, the present invention is described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains them at locations in the memory system of the computing device, which reconfigures or otherwise alters the operation of the device in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

The present invention provides a method for frustrating statistical attacks by injecting pseudo-data packets into an encrypted data stream. In FIG. 1, a sending computing device (hereafter, "sender") 100 communicates with a receiving computing device (hereafter, "receiver") 102 via a network connection 104 by sending encrypted data packets to the receiver 102. A statistical attacker 106 intercepts the data traffic on the network connection 104. By statistically analyzing the intercepted data traffic, the statistical attacker 106 wishes to decrypt the data packets sent by the sender 100 and read their contents. While the network connection 104 may be of any type, wireless networks, such as those using the 802.11 Wireless LAN (Local Area Network) standard, are especially subject to statistical attack because it is difficult or impossible to prevent the attacker 106 from having physical access to all communications on the network 104.

Figure 2:
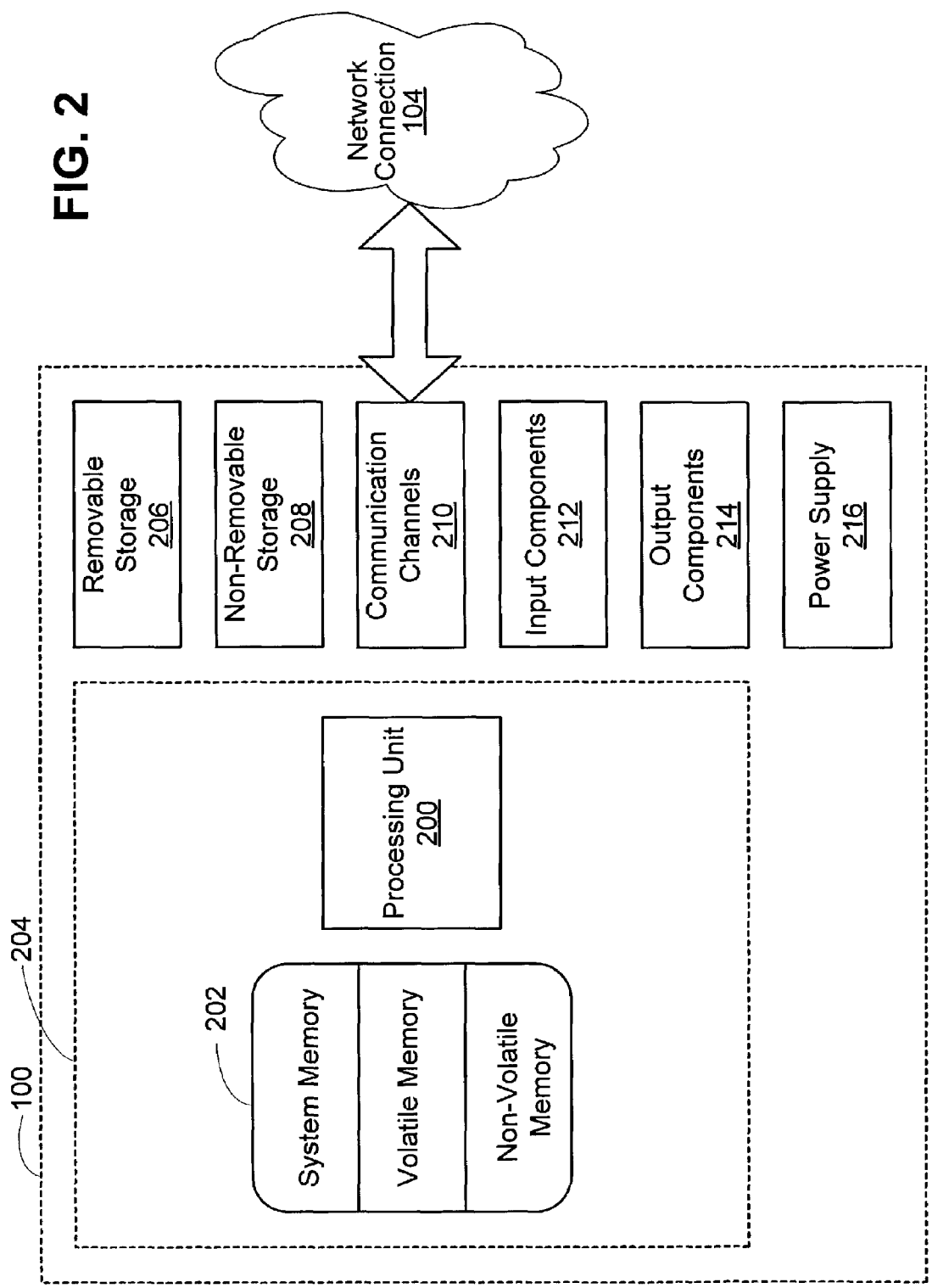
FIG. 2 is a schematic diagram generally illustrating an exemplary computer system that supports the present invention.

The computing device 100 of FIG. 1 may be of any architecture. FIG. 2 is a block diagram generally illustrating an exemplary computer system that supports the present invention. The computer system of FIG. 2 is only one example of a suitable environment and is not intended to suggest any limitation as to the scope of use or functionality of the invention. Neither should the computing device 100 be interpreted as having any dependency or requirement relating to any one or combination of components illustrated in FIG. 2. The invention is operational with numerous other general-purpose or special-purpose computing environments or configurations. Examples of well known computing systems, environments, and configurations suitable for use with the invention include, but are not limited to, personal computers, servers, hand-held or laptop devices, multiprocessor systems, microprocessor-based systems, set-top boxes, programmable consumer electronics, network PCs (personal computers), minicomputers, mainframe computers, and distributed computing environments that include any of the above systems or devices. In its most basic configuration, the computing device 100 typically includes at least one processing unit 200 and memory 202. The memory 202 may be volatile (such as RAM (random access memory)), non-volatile (such as ROM (read-only memory) or flash memory), or some combination of the two. This most basic configuration is illustrated in FIG. 2 by the dashed line 204. The computing device may have additional features and functionality. For example, the computing device 100 may include additional storage (removable and non-removable) including, but not limited to, magnetic and optical disks and tape. Such additional storage is illustrated in FIG. 2 by removable storage 206 and non-removable storage 208. Computer-storage media include volatile and non-volatile, removable and non-removable, media implemented in any method or technology for storage of information such as computer-readable instructions, data structures, program modules, or other data. Memory 202, removable storage 206, and non-removable storage 208 are all examples of computer-storage media. Computer-storage media include, but are not limited to, RAM, ROM, EEPROM, (electrically-erasable programmable read-only memory), flash memory, other memory technology, CD-ROM, compact disc read-only memory), digital versatile disks, other optical storage, magnetic cassettes, magnetic tape, magnetic disk storage, other magnetic storage devices, and any other media that can be used to store the desired information and that can be accessed by device 100. Any such computer-storage media may be part of device 100. Device 100 may also contain communications channels 210 that allow the device to communicate with other devices. Communications channels 210 are examples of communications media. Communications media typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, RF, (radio frequency), infrared, and other wireless media. The term "computer-readable media" as used herein includes both storage media and communications media. The computing device 100 may also have input devices 212 such as a keyboard, mouse, pen, voice-input device, touch-input device, etc. Output devices 214 such as a display, speakers, and printer may also be included. All these devices are well known in the art and need not be discussed at length here. Computing device 100 may also include a power supply 216.

FIGS. 3a through 3d show the messages passed and the operations performed by the sender 100 and the receiver 102 of FIG. 1 for frustrating statistical attacks by the statistical attacker 106 according to one aspect of the present invention. In these Figures, time flows downward and from one Figure to the next. The sender 100 and the receiver 102 first agree upon an encoding scheme in step 300. The encoding scheme includes an encryption method and a data integrity check method, either or both of which may be specified by the communications protocols used by the sender 100 and the receiver 102. For example, if the sender 100 and the receiver 102 communicate via the 802.11 wireless protocol, then they may use the WEP (Wired-Equivalent Privacy) encoding scheme. Note that the methods of the present invention are not restricted to any particular communications technology or encoding scheme. When the sender 100 gets data that it wishes to send to the receiver 102 in step 302, it adds data integrity check information to the data in step 304. The sender 100 then encrypts the data along with the data integrity check information using the agreed-upon encoding scheme in step 306. The encrypted data are put into a packet which is then transmitted to the receiver 102 in step 308. The receiver 102 receives the data packet in step 310 and decrypts the data packet using the agreed-upon encoding scheme in step 314. In step 318, the receiver 102 calculates data integrity check information from the decrypted data. The receiver 102 then compares the data integrity check information it calculated with the check information received in the data packet in step 318. If the integrity check succeeds (the usual case), then the receiver 102 accepts the decrypted data in step 320.

Responding to a trigger discussed further below, in step 322 the sender 100 generates pseudo data. In step 324, pseudo-data integrity check information is added to the pseudo data. In step 326, the sender 100 encodes the pseudo data using an encoding scheme different from the scheme agreed upon with the receiver 102 (in step 300). The pseudo-data packet is then transmitted to the receiver 102 in step 328. As in steps 310, 314, and 318 above, the receiver 102 receives the pseudo-data packet (step 330), decrypts the pseudo-data packet using the agreed-upon encoding scheme (step 334), and then checks the decrypted pseudo-data integrity check information (step 338). This time, however, the integrity check fails because the pseudo-data packet was encoded using an encoding scheme different from the one used by the receiver 102 to decode the packet. The receiver 102 discards the decrypted pseudo data in step 340.

Meanwhile, during transmission over the network connection 104, the real-data packets and the pseudo-data packets are exposed to interception by the statistical attacker 106 in steps 312 and 332. Because the statistical attacker 106 does not know the encoding schemes, the statistical attacker 106 cannot differentiate between the two types of data packets. All intercepted data packets, both real-data packets and pseudo-data packets, are then used in the statistical analysis of steps 316 and 336. This mingling of pseudo-data packets, which do not conform to the agreed-upon encoding scheme with the real-data packets frustrates the statistical analysis used to attempt to uncover that encoding scheme.

Figure 3C:
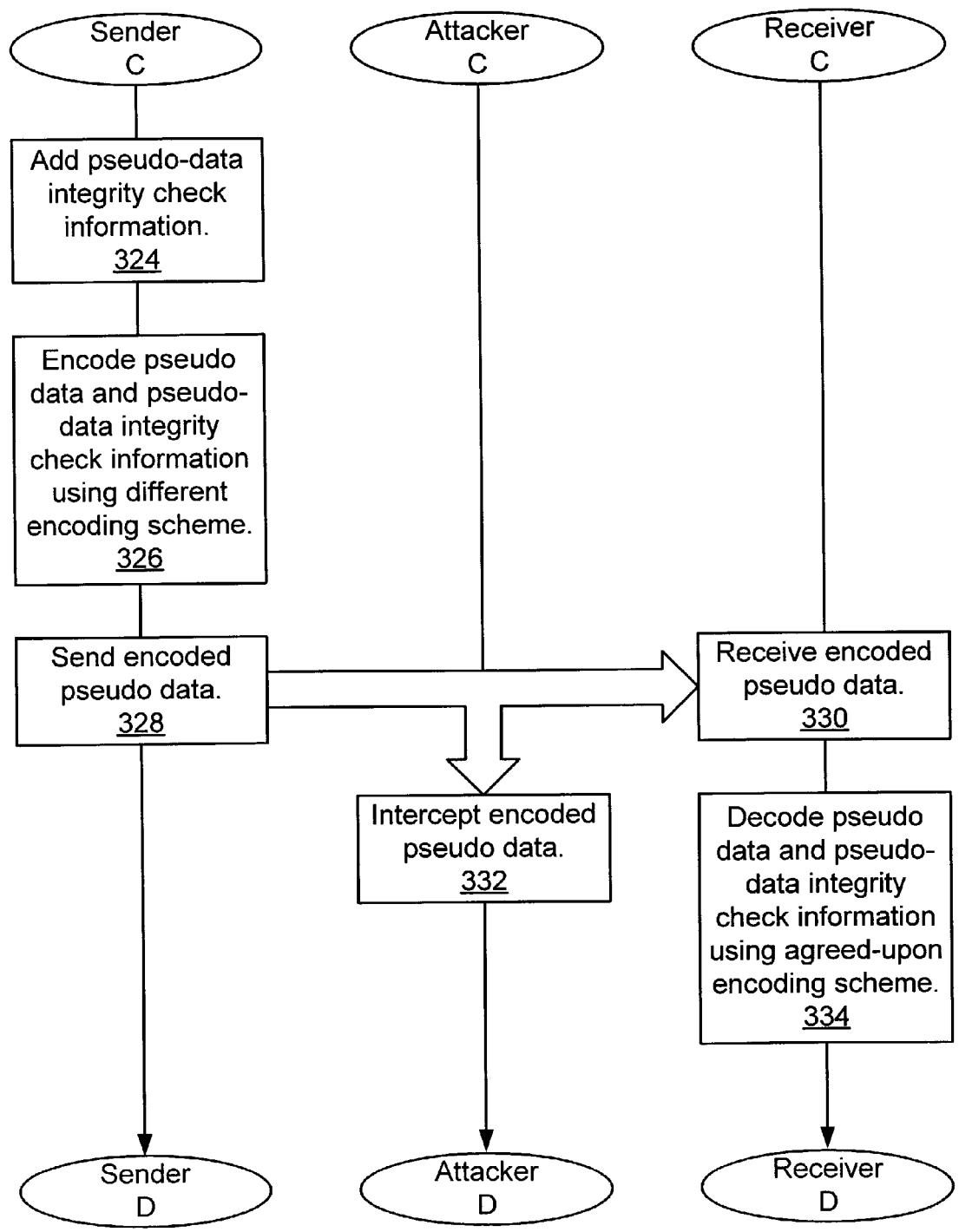
Figure 4:
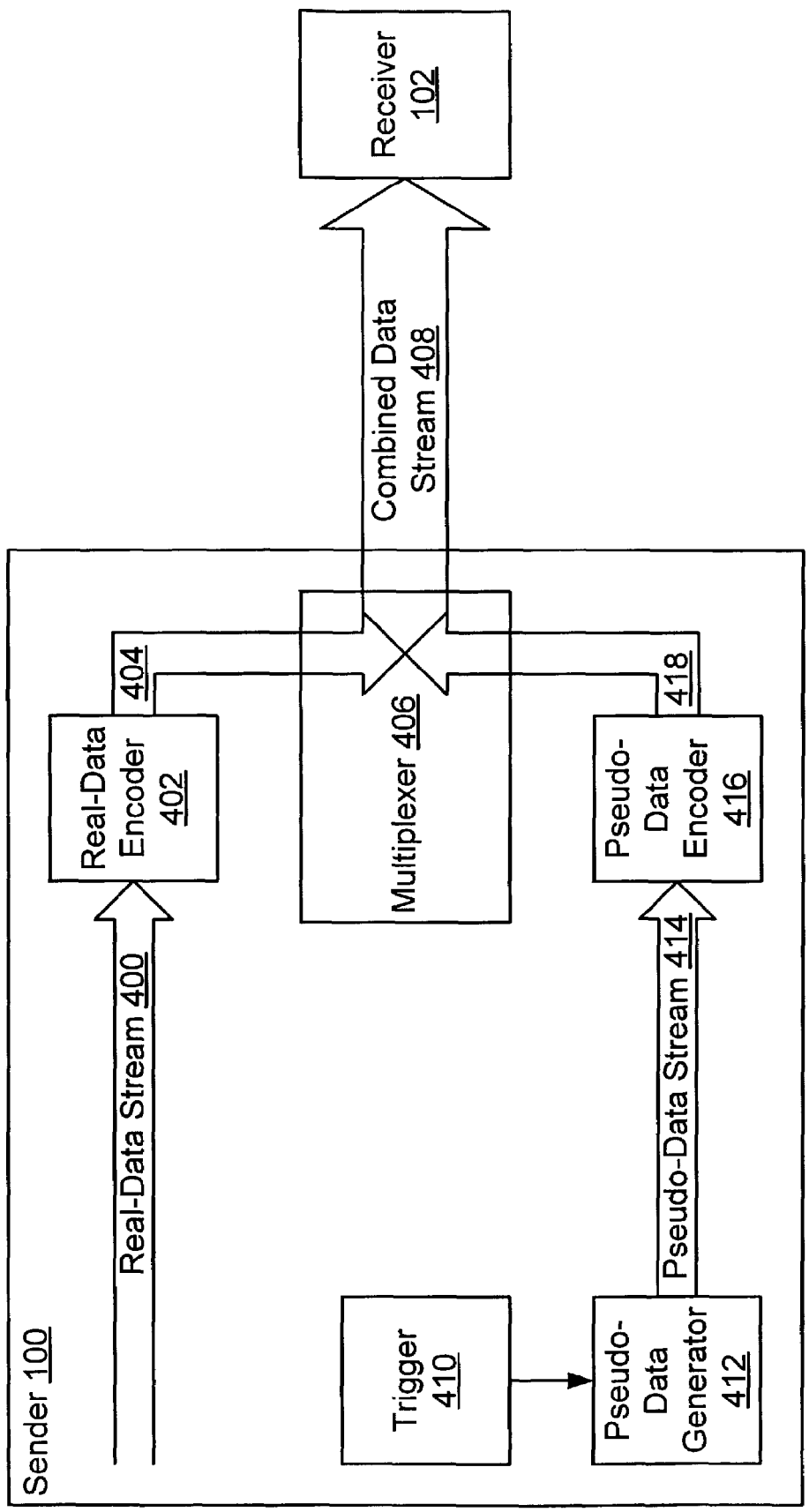
FIG. 4 is a schematic diagram illustrating exemplary functional modules of a sender usable for performing a method for enhancing security in the network communication setup of FIG. 1 according to one aspect of the present invention.

FIG. 4 shows the functional modules of an exemplary sender 100 performing the method of FIGS. 3a through 3d. In its very basic configuration, the sender 100 includes a "real-data" encoder 402, a pseudo-data generation trigger 410, a pseudo-data generator 412, and a multiplexer 406. The real-data encoder 402 receives a real-data stream 400 from one or more applications (not shown) and divides the real-data stream 400 into packets. For each packet, the real-data encoder 402 generates data integrity check information, appends that information to the data, and encrypts the result using the encoding scheme agreed upon by the sender 100 and the receiver 102. Meanwhile, the pseudo-data generator 412 generates pseudo-data packets, and the pseudo-data encoder 416 encrypts them using an encoding scheme different from the agreed-upon encoding scheme. The pseudo-data generation trigger 410 controls when the pseudo-data generator 412 generates pseudo-data packets. The multiplexer 406 transmits the real-data packets (404) and the pseudo-data packets (418) in the combined data stream 408 to the receiver 102.

Figure 5:
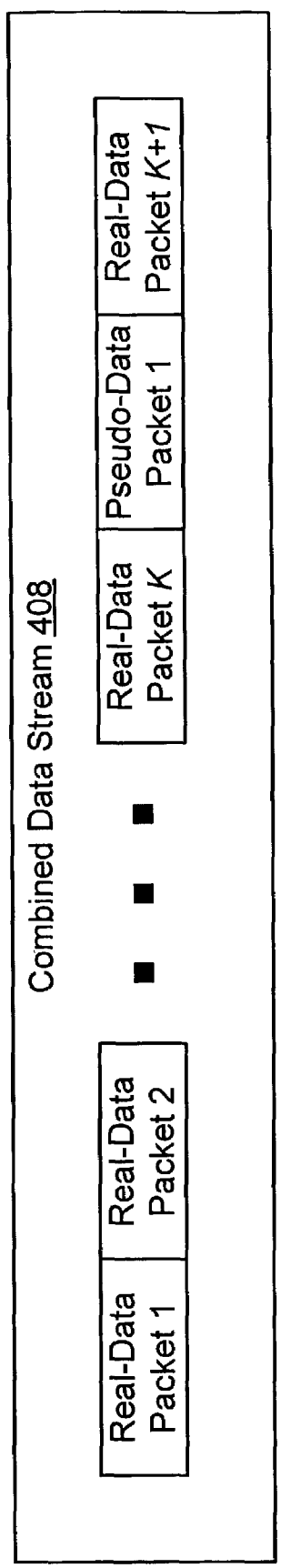
FIG. 5 is a block diagram illustrating exemplary traffic combining real-data packets and a pseudo-data packet.

FIG. 5 illustrates an example of the combined data stream 408. K real-data packets are followed by one pseudo-data packet which is followed in turn by another real-data packet. All of the K+1 real-data packets are encrypted using the agreed-upon encoding scheme.

Figure 6:
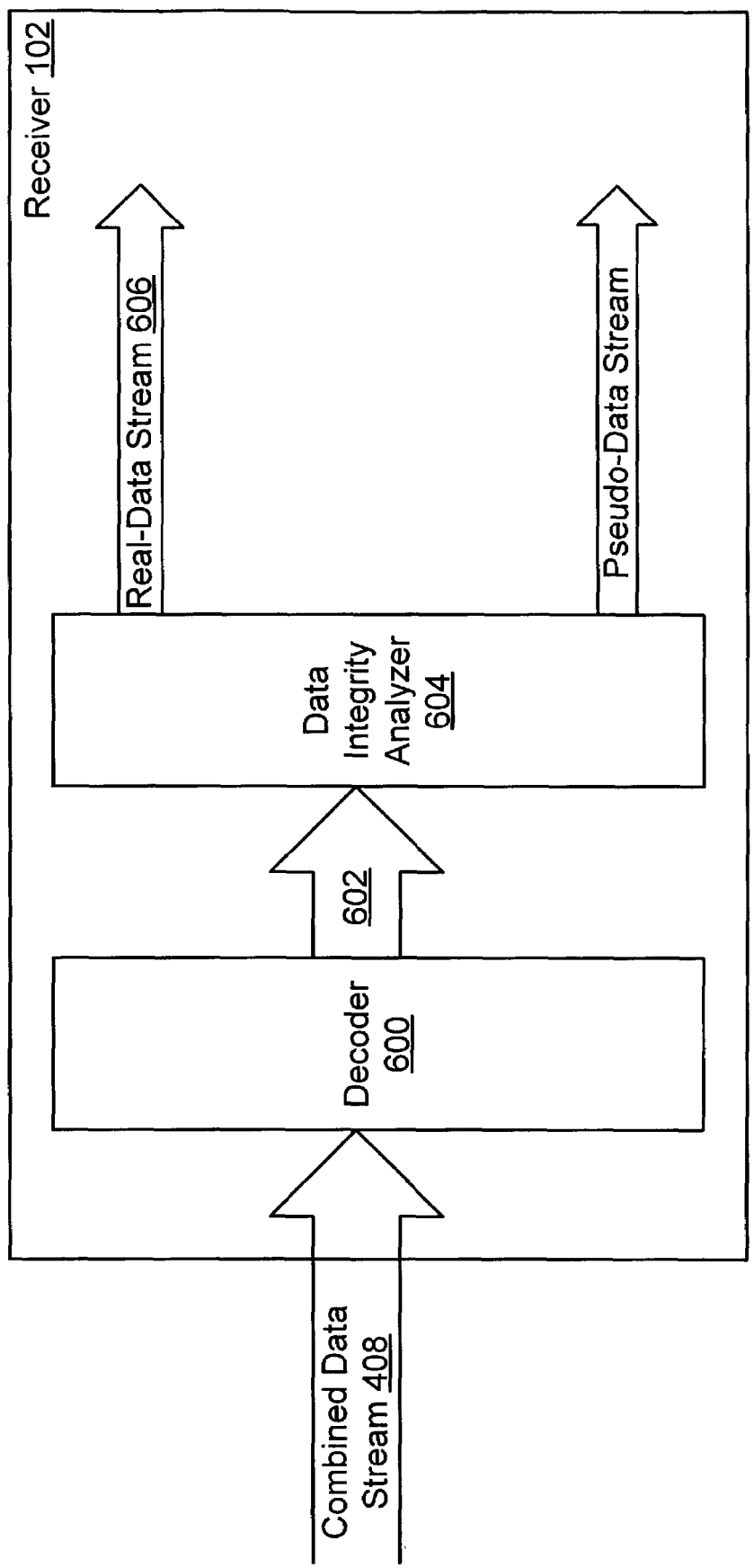
FIG. 6 is a schematic diagram showing the functional modules of a receiver receiving real-data and pseudo-data packets.

FIG. 6 shows an exemplary receiver 102 with a decoder 600 and a data integrity analyzer 604. The decoder 600 decrypts each received data packet in the combined data stream 408 using the agreed-upon encoding scheme. The decrypted packets 602 go to the data integrity analyzer 604 which verifies whether, according to the data integrity check information included in each data packet, the decrypted data match the original data sent by the sender 100. If they do match, the receiver 102 accepts the decrypted data and sends them in data stream 606 to their intended applications (not shown). As intended by the sender 100, the pseudo-data packets fail the data integrity check and are discarded.

Figure 7:
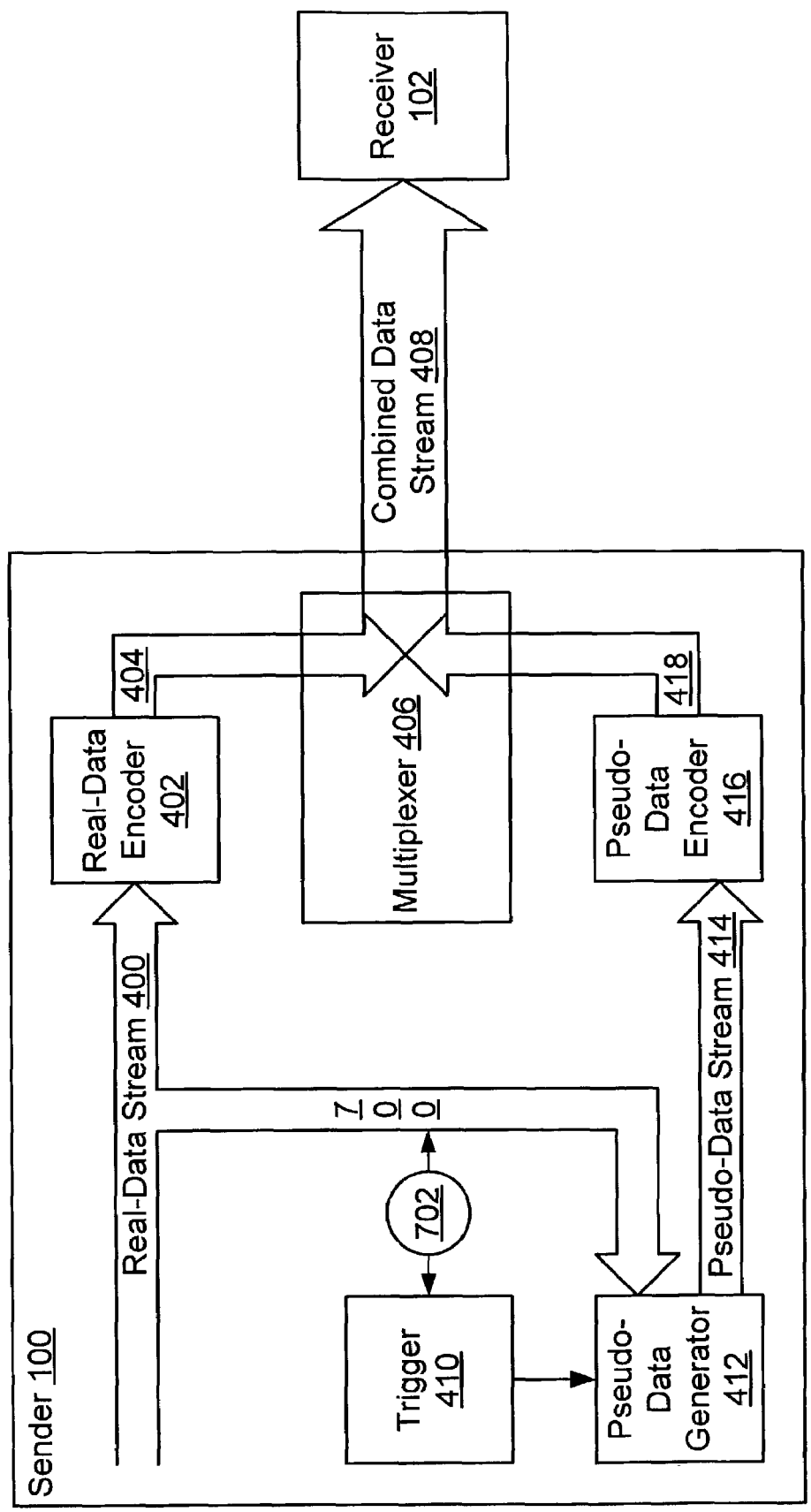
FIG. 7 is a schematic diagram illustrating exemplary data flows within a sender usable for generating pseudo data and for shaping combined real-data and pseudo-data traffic.

As discussed above with reference to FIGS. 3a through 3d, the sender 100 generates pseudo data in response to a pseudo-data generation trigger (step 322), encodes the pseudo data (steps 324 and 326), and sends the encoded pseudo data to the receiver 102 (step 328). There are many ways in which the sender 100 can perform these operations. FIG. 7 adds some detail to FIG. 4's schematic diagram of an exemplary sender 100 to illustrate possibilities for generating pseudo data and for triggering that generation.

Because the pseudo data are eventually discarded by the receiver 102, their exact contents are of little importance. One way to generate pseudo data is for the pseudo-data generator 412 to randomly create pseudo data. Another possibility is illustrated in FIG. 7. The stream of real data 400 flowing to the real-data encoder 402 is intercepted and some of the real data are copied into data stream 700. The pseudo-data generator 412 uses the intercepted real data as input when it generates the pseudo-data stream 414. In a typical communications scenario, the amount of pseudo data sent is far less than the amount of real data sent. The arrow of control flow 702 from the pseudo-data generation trigger 410 to the dataflow 700 indicates that the trigger 410 controls the amount and timing of this internal interception of the real-data stream 400.

The pseudo-data generation trigger 410 may monitor the real-data stream 400 in order to decide when the next pseudo-data packet should be transmitted. In one implementation, a target is set, the target indicating the desired approximate fraction of all packets transmitted that should be pseudo-data packets. The target packet count is the inverse of the target fraction. For example, a target fraction of 2% yields a target packet count of 50. One pseudo-data packet is transmitted for approximately every target packet count (here, 50) real-data packets. To prevent this pattern from being easily detectable, the trigger 410 generates random packet counts, the random packet counts clustered around the target packet count. Then the trigger 410 counts real-data packets as they are transmitted and causes a pseudo-data packet to be generated and transmitted when the count reaches the generated random packet count. Another random packet count is generated, and the process repeats.

In another implementation, a target fraction is set based on the amount of data transmitted rather than on the number of packets. For example, it may be decided that approximately 4% of all data bytes transmitted should be pseudo-data bytes. The details of this implementation are similar to the one just described with the pseudo-data generation trigger 410 monitoring the real-data stream 400 and counting the number of data bytes transmitted. Similar to that implementation, a random data-byte count is generated, and a pseudo-data packet is transmitted once the count of transmitted real-data bytes reaches the generated random data-byte count multiplied by the number of pseudo-data bytes in a packet.

In yet another implementation, the pseudo-data generation trigger 410 can base its decision on a timer value, e.g., causing a pseudo-data packet to be transmitted approximately once per minute. These implementations and others can be combined to more thoroughly randomize the transmission of pseudo-data packets. Even more sophisticated techniques may be employed, as discussed next.

Even though the statistical attacker 106 cannot decrypt the data packets, it may still be able to determine which packets contain pseudo-data and so prevent them from frustrating the statistical attack. The statistical attacker 106 can do this by monitoring differences in the overall shape (e.g., data packet sizes and transmission rates) of the traffic sent by the sender 100. To prevent this, aspects of the present invention generate and send pseudo-data packets at random intervals so that the shape of the combined real- and pseudo-data traffic stream 408 closely matches that expected for real-data traffic alone. For example, a real-time audio or video download from the sender 100 to the receiver 102 may involve a near-constant rate of transmission of identically sized packets. Monitoring this traffic, the statistical attacker 106 may be alerted to the presence of pseudo-data packets if there are periodic fluctuations in packet size or in transmission rate. To prevent alerting the statistical attacker 106, the pseudo-data generation trigger 410 monitors the stream of real data 400 to determine the shape of the sender 100's real-data traffic. Via control flow 702, the trigger 410 may apply statistical analysis techniques to the internally intercepted real-data traffic stream 700. Then, the trigger 410 causes the pseudo-data generator 412 to generate pseudo-data packets of the same size as the real-data packets and to keep the transmission rate nearly constant. In the general case, the trigger 410 operates in conjunction with the pseudo-data generator 412 (in step 322 of FIG. 3b) to mimic the packet sizes, transmission rates, fluctuations, and other characteristics of the sender 100's current real-data traffic.

Just as there are many possible ways to generate the pseudo data in step 322 of FIG. 3b, there are many possible ways to encode the pseudo data in steps 324 and 326 of FIG. 3c. There are two basic requirements for this encoding: (1) the encoded pseudo data should not be readily distinguishable from encoded real data by the statistical attacker 106 and (2) the encoded pseudo data should fail verification on the receiver 102 when decoded using the agreed-upon encoding scheme (steps 334, 338, and 340 of FIGS. 3c and 3d). Several possible methods focus on the encryption part of the encoding scheme. When the agreed-upon encoding scheme uses an encryption key (e.g., a key shared between the sender 100 and the receiver 102 or a public key/private key arrangement), the pseudo-data encoder 416 of FIG. 4 can apply the same encryption algorithm used by the real-data encoder 402. However, rather than using the encryption key specified in the agreed-upon scheme, the pseudo-data encoder 416 uses another key, possibly simply a random number generated by the pseudo-data encoder 416. By encoding the pseudo data with the "wrong" key, the sender 100 ensures that the pseudo data will be discarded when the receiver 102 attempts to decode the pseudo data with the agreed-upon key.

Other pseudo-data encoding schemes focus on the data integrity check information part of the encoding scheme. For example, the data integrity check information can be created randomly or can have one or more of its bits "flipped" (a logical 1 becomes a logical 0 or vice versa). The result can then be encrypted using the agreed-upon encoding scheme and will be discarded by the receiver 102 as failing the data integrity check (step 338 of FIG. 3d). Another pseudo-data encoding method is even simpler: the pseudo data are encoded using the agreed-upon encoding scheme and then one or more bits of the encoded result are flipped. The pseudo data will fail the receiver 102's data integrity check and be discarded. Many other encoding techniques are possible, from simply generating random data to applying sophisticated techniques that in some way differ from the agreed-upon encoding scheme. As long as the encoded pseudo data meet the two requirements given in the paragraph just above this one, a pseudo-data encoding technique produces at least some of the advantages of the present invention.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

We claim:

1. A method for a sender to enhance security when transmitting "real" data from the sender to a receiver over a network connection, wherein the sender and the receiver agree upon an encoding scheme for encrypting the real data, the method comprising:
   encrypting the real data using the agreed-upon encoding scheme to produce encrypted real data;
   assembling the encrypted real data into a plurality of real-data packets, wherein the encrypted real data in each of the plurality of real-data packets has been encrypted using the same encoding scheme;

encrypting pseudo data using a second encoding scheme to produce encrypted pseudo data, the second encoding scheme differing from the agreed-upon encoding scheme;

assembling the encrypted pseudo data into a pseudo-data packet such that the pseudo-data packet comprises the encrypted pseudo data; and combining the plurality of real-data packets and the pseudo-data packet into one data stream and transmitting the data stream to the receiver.

2. The method of claim 1 wherein using the agreed-upon encoding scheme comprises encrypting with a first encryption key and wherein using the second encoding scheme comprises encrypting with a second encryption key, the second encryption key differing from the first encryption key.

3. The method of claim 1 wherein using the second encoding scheme comprises generating pseudo-data integrity check information according to the agreed-upon encoding scheme and then flipping a bit value in the pseudo data and/or the pseudo-data integrity check information.

4. The method of claim 1 further comprising combining the pseudo data with pseudo-data integrity check information and encrypting the combined pseudo data and pseudo-data integrity check information, wherein using the second encoding scheme comprises using the agreed-upon encoding scheme and then flipping a bit value in the encrypted combined pseudo data and pseudo-data integrity check information.

5. The method of claim 1 wherein using the second encoding scheme comprises encrypting the combined pseudo data and pseudo-data integrity check information using a technique selected from the group consisting of: public key/private key encryption and shared-key encryption.

6. The method of claim 1 further comprising:

setting a target a time interval between transmissions of pseudo-data packets in the datastream;

generating a random time interval, the generating biased to produce random time intervals clustered around the target time interval; and associating a timer with transmitting at least one of the pseudo-data packets;

and wherein the at least one of the pseudo-data packets is transmitted upon expiration of the timer.

7. The method of claim 1 further comprising:

setting a target for a fraction of packets transmitted to be pseudo-data packets;

generating a random packet count, the generating biased to produce random packet counts clustered around the inverse of the target fraction; and counting transmitted packets;

and wherein transmitting the pseudo-data packet comprises transmitting the pseudo-data packet upon a count of transmitted packets equaling the random packet count.

8. The method of claim 1 further comprising:

setting a target for a fraction of data transmitted to be pseudo-data;

generating a random data count, the generating biased to produce random data counts clustered around the inverse of the target fraction; and counting transmitted data;

and wherein transmitting the pseudo-data packet comprises transmitting the pseudo-data packet upon a count of transmitted data multiplied by a count of pseudo-data in the pseudo-data packet equaling or exceeding the random data count.

9. The method of claim 1 further comprising:

monitoring real-data traffic in the datastream, the real-data traffic comprising real-data packets transmitted by the sender to the receiver; and analyzing the monitored real-data traffic to deduce characteristics of the real-data traffic;

and wherein generating pseudo data comprises generating pseudo data such that characteristics of combined data traffic, the combined data traffic comprising real-data packets and pseudo-data packets transmitted by the sender to the receiver, mimic the characteristics of the monitored real-data traffic.

10. The method of claim 9 wherein analyzing comprises deducing characteristics of the real-data traffic, the characteristics selected from the set consisting of: packet sizes and transmission rates.

11. The method of claim 1, wherein all of the real data packets in the data stream are encoded using the same, agreed-upon encoding scheme.

12. The method of claim 1, wherein the second encoding scheme is selected such that the pseudo-data packet will be discarded by the receiver.

13. A computer-readable medium containing instructions for performing a method for a sender to enhance security when transmitting "real" data from the sender to a receiver over a network connection, wherein the sender and the receiver agree upon an encoding scheme for encrypting the real data, the method comprising:

encrypting the real data using the agreed-upon encoding scheme to produce encrypted real data;

assembling the encrypted real data into a plurality of real-data packets, wherein the encrypted real data in each of the plurality of real-data packets has been encrypted using the same encoding scheme;

encrypting pseudo data using a second encoding scheme to produce encrypted pseudo data, the second encoding scheme differing from the agreed-upon encoding scheme;

assembling the encrypted pseudo data into a pseudo-data packet such that the pseudo-data packet comprises the encrypted pseudo data; and combining the plurality of real-data packets and the pseudo-data packet into one data stream and transmitting the data stream to the receiver.

14. A system for a sender to enhance security when transmitting "real" data from the sender to a receiver over a network connection, wherein the sender and the receiver agree upon an encoding scheme for encrypting the real data, the system comprising:

a real-data encoder that encodes real data into a plurality of real-data packets according to the agreed-upon encoding scheme such that the real data in each of the plurality of real-data packets is encoded according to the same encoding scheme;

a pseudo-data generator;

a pseudo-data encoder that encodes generated pseudo data into pseudo-data packets according to a second encoding scheme, the second encoding scheme differing from the agreed upon encoding scheme; and a multiplexer for transmitting the real-data packets and the pseudo-data packets to the receiver by combining the plurality of real-data packets and the pseudo-data packets into one data stream.

15. The system of claim 14 wherein the pseudo-data generator copies real data to generate the pseudo data.

16. The system of claim 14 further comprising:
a random time interval generator, the generator biased to produce random time intervals clustered around a target for a time interval between transmitting pseudo-data packets; and a timer associated with transmitting a pseudo-data packet;
and wherein the multiplexer transmits a pseudo-data packet upon expiration of the timer.

17. The system of claim 14 further comprising:
a random packet count generator, the generator biased to produce random packet counts clustered around an inverse of a target for a fraction of packets transmitted to be pseudo-data packets; and
a counter for counting transmitted packets;
and wherein the multiplexer transmits a pseudo-data packet upon a count of transmitted packets equaling a generated random packet count.

18. The system of claim 14 further comprising:
a random data count generator, the generator biased to produce random data counts clustered around an inverse of a target for a fraction of data transmitted to be pseudo-data; and a counter for counting transmitted data;
and wherein the multiplexer transmits a pseudo-data packet upon a count of transmitted data multiplied by a count of pseudo-data in the pseudo-data packet equaling or exceeding a generated random data count.

19. The system of claim 14 further comprising:
a monitor that monitors real-data traffic, real-data traffic comprising real-data packets transmitted by the sender to the receiver;
a real-data traffic analyzer that deduces characteristics of the monitored real-data traffic; and
a pseudo-data generation trigger that directs the pseudo-data generator to generate pseudo data so that characteristics of combined data traffic, the combined data traffic comprising real-data packets and pseudo-data packets transmitted by the sender to the receiver, mimic the characteristics of the monitored real-data traffic.

20. A computer-readable medium containing instructions for providing a system for a sender to enhance security when transmitting "real" data from the sender to a receiver over a network connection, wherein the sender and the receiver agree upon an encoding scheme for encrypting the real data, the system comprising:
a real-data encoder that encodes real data into a plurality of real-data packets according to the agreed-upon encoding scheme such that the real data in each of the plurality of real-data packets is encoded according to the same encoding scheme;
a pseudo-data generator;
a pseudo-data encoder that encodes the generated pseudo data into pseudo-data packets according to a second encoding scheme, the second encoding scheme differing from the agreed-upon encoding scheme; and
a multiplexer for transmitting the plurality of real-data packets and the pseudo-data packets to the receiver by combining the plurality of real-data packets and the pseudo-data packets into one data stream.

21. A system for a sender to enhance security when transmitting "real" data from the sender to a receiver over a network connection, wherein the sender and the receiver agree upon an encoding scheme for encrypting the real data, the system comprising:
a real-data encoder that encodes real data into a plurality of real-data packets according to the agreed-upon encoding scheme such that the real data in each of the plurality of real-data packets is encoded according to the same encoding scheme;
means for triggering generation of pseudo data;
a pseudo-data generator;
a pseudo-data encoder that encodes the generated pseudo data into pseudo-data packets according to a second encoding scheme, the second encoding scheme differing from the agreed-upon encoding scheme; and
a multiplexer for transmitting the plurality of real-data packets and the pseudo-data packets to the receiver by combining the plurality of real-data packets and the pseudo-data packets into one data stream.

22. A computer-readable medium containing instructions for providing a system for a sender to enhance security when transmitting "real" data from the sender to a receiver over a network connection, wherein the sender and the receiver agree upon an encoding scheme for encrypting the real data, the system comprising:
a real-data encoder that encodes real data into a plurality of real-data packets according to the agreed-upon encoding scheme such that the real data in each of the plurality of real-data packets is encoded according to the same encoding scheme;
means for triggering generation of pseudo data;
a pseudo-data generator;
a pseudo-data encoder that encodes the generated pseudo data into pseudo-data packets according to a second encoding scheme, the second encoding scheme differing from the agreed-upon encoding scheme; and
a multiplexer for transmitting the plurality of real-data packets and the pseudo-data packets to the receiver by combining the plurality of real-data packets and the pseudo-data packets into one data stream.

* * * * *